(12) United States Patent
Ohta et al.

(10) Patent No.: US 10,098,364 B2
(45) Date of Patent: Oct. 16, 2018

(54) METHOD OF PRESERVING FRESHNESS OF HARVESTED CROPS, FRESHNESS PRESERVATION DEVICE, REPOSITORY, AND DISPLAY DEVICE

(71) Applicant: Panasonic Intellectual Property Management Co., Ltd., Osaka (JP)

(72) Inventors: Takashi Ohta, Tokyo (JP); Kazuki Harada, Osaka (JP); Shinichi Aoki, Osaka (JP); Makoto Yamada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/246,211

(22) Filed: Aug. 24, 2016

(65) Prior Publication Data

US 2017/0055538 A1     Mar. 2, 2017

(30) Foreign Application Priority Data

Sep. 1, 2015    (JP) ................................. 2015-172360

(51) Int. Cl.
| | |
|---|---|
| *A23B 7/015* | (2006.01) |
| *A01G 7/04* | (2006.01) |
| *H05B 33/08* | (2006.01) |
| *A23N 15/06* | (2006.01) |
| *A23L 3/26* | (2006.01) |

(52) U.S. Cl.
CPC ................ *A23B 7/015* (2013.01); *A01G 7/04* (2013.01); *A23L 3/266* (2013.01); *A23N 15/06* (2013.01); *H05B 33/086* (2013.01); *H05B 33/0845* (2013.01); *A01G 7/045* (2013.01); *A23V 2002/00* (2013.01)

(58) Field of Classification Search
CPC ........... A01G 7/04–7/045; A23N 15/06; A23B 4/015; A23B 5/015; A23B 7/015; A23B 9/06; A23L 3/26–3/28; H05B 33/0845; H05B 33/086
USPC ............ 426/248, 418–419, 506; 99/451, 467
See application file for complete search history.

(56) References Cited

U.S. PATENT DOCUMENTS

| | | | | |
|---|---|---|---|---|
| 2,039,768 | A * | 5/1936 | Bird | A23B 7/00 239/121 |
| 2,113,782 | A * | 4/1938 | Coulter | A23B 7/00 239/10 |
| 3,016,788 | A * | 1/1962 | Smith | B07C 5/342 209/581 |
| 3,287,586 | A * | 11/1966 | Bickford | C09K 11/68 252/301.5 |
| 4,039,889 | A * | 8/1977 | Vicai | H01J 61/16 313/487 |
| 4,808,303 | A * | 2/1989 | Edwards | A47F 3/0495 210/138 |

(Continued)

FOREIGN PATENT DOCUMENTS

| | | | |
|---|---|---|---|
| CN | 1817148 B | * | 11/2010 |
| CN | 104865358 A | * | 8/2015 |

(Continued)

*Primary Examiner* — Drew E Becker
(74) *Attorney, Agent, or Firm* — Takashi Saito

(57) ABSTRACT

A method of preserving freshness of a harvested crop includes irradiating the harvested crop with blue light and misting the harvested crop with water mist while irradiating the harvested crop with the blue light.

14 Claims, 14 Drawing Sheets

(56) References Cited

U.S. PATENT DOCUMENTS

| | | | | |
|---|---|---|---|---|
| 5,547,693 A * | 8/1996 | Krochta | ............... | A23B 7/16 426/102 |
| 5,740,970 A * | 4/1998 | Edwards | ............ | A47F 3/001 239/551 |
| 7,685,641 B1 * | 3/2010 | Brody | ............... | G11B 19/04 369/53.21 |
| 7,726,147 B2 * | 6/2010 | Lee | ............... | A23B 7/015 426/248 |
| 9,210,944 B2 * | 12/2015 | Chen | ............... | A23B 7/015 |
| 2001/0047618 A1 * | 12/2001 | Fang | ............... | A01G 7/045 47/65.5 |
| 2004/0230102 A1 * | 11/2004 | Anderson, Jr. | ...... | A01G 7/045 600/231 |
| 2006/0042300 A1 * | 3/2006 | Kim | ............... | A23B 7/04 62/348 |
| 2007/0104841 A1 * | 5/2007 | Min | ............... | A23L 3/005 426/248 |
| 2009/0142458 A1 * | 6/2009 | McCann | ............ | A23B 4/066 426/231 |
| 2009/0280223 A1 * | 11/2009 | Scott | ............... | A23B 4/015 426/237 |
| 2010/0223944 A1 * | 9/2010 | Tsujimoto | ......... | A23B 7/0433 62/264 |
| 2011/0209404 A1 * | 9/2011 | Scott | ............... | A01G 7/00 47/58.1 LS |
| 2014/0123554 A1 * | 5/2014 | Chen | ............... | A23B 7/015 47/58.1 LS |
| 2014/0311359 A1 * | 10/2014 | Lee | ............... | A23B 7/015 99/451 |
| 2015/0230625 A1 * | 8/2015 | Gschwind | ......... | A47F 3/001 426/506 |
| 2015/0313091 A1 * | 11/2015 | Ara | ............... | A01G 1/001 47/58.1 LS |
| 2016/0015038 A1 * | 1/2016 | Ferrell | ............ | A23L 3/3481 800/298 |
| 2016/0100536 A1 * | 4/2016 | Wu | ............... | A01G 31/06 47/64 |

FOREIGN PATENT DOCUMENTS

| | | | | |
|---|---|---|---|---|
| EP | 2128546 A1 | * | 12/2009 | ............ A23B 7/01 |
| GB | 2402037 A | * | 12/2004 | ............ A01G 7/045 |
| JP | 06-090659 A | | 4/1994 | |
| JP | 2002-267348 A | | 9/2002 | |
| JP | 2008-051493 A | | 3/2008 | |
| JP | 2012200231 A | * | 10/2012 | |
| JP | 2014-194331 A | | 10/2014 | |
| SU | 762797 B | * | 9/1980 | |
| WO | 2013/031925 A1 | | 3/2013 | |

* cited by examiner

METHOD OF PRESERVING FRESHNESS OF HARVESTED CROPS, FRESHNESS PRESERVATION DEVICE, REPOSITORY, AND DISPLAY DEVICE

CROSS REFERENCE TO RELATED APPLICATION

This application claims the benefit of priority of Japanese Patent Application Number 2015-172360 filed on Sep. 1, 2015, the entire content of which is hereby incorporated by reference.

BACKGROUND

1. Technical Field

The present disclosure relates to a method of preserving the freshness of a harvested crop, a freshness preservation device, a repository, and a display device.

2. Description of the Related Art

Preserving the freshness of a harvested crop is significantly important as the value of a harvested crop is greatly affected by its freshness. The freshness of a crop can be evaluated based on, for example, weight loss (amount of water lost through transpiration). One conventional technique of preserving the freshness of a crop is refrigeration (for example, see Japanese Unexamined Patent Application Publication No. 2002-267348).

SUMMARY

However, refrigerating crops can be costly, and there are times when the crops cannot he sufficiently refrigerated, such as during transportation.

The present disclosure provides a method of preserving freshness, a freshness preservation, device, a repository, and a display device which are capable of preserving the freshness of a harvested crop with a method different from refrigeration.

According to one aspect of the present disclosure, a method of preserving freshness of a harvested crop includes irradiating the harvested crop with blue light and misting the harvested crop with water mist while irradiating the harvested crop with the blue tight.

According to one aspect of the present disclosure, a freshness preservation device for preserving freshness of a harvested crop includes a first illuminant that irradiates the harvested crop with blue light; and a mister that mists the harvested crop with water mist while the first illuminant irradiates the harvested crop with the blue light.

According to one aspect of the present disclosure, a repository includes the above freshness preservation device and a housing that houses the harvested crop.

According to one aspect of the present disclosure, a display device includes the above freshness preservation device and a shelf for displaying the harvested crop.

Accordingly, the freshness of a crop can be preserved with a method that is different from refrigeration.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1:
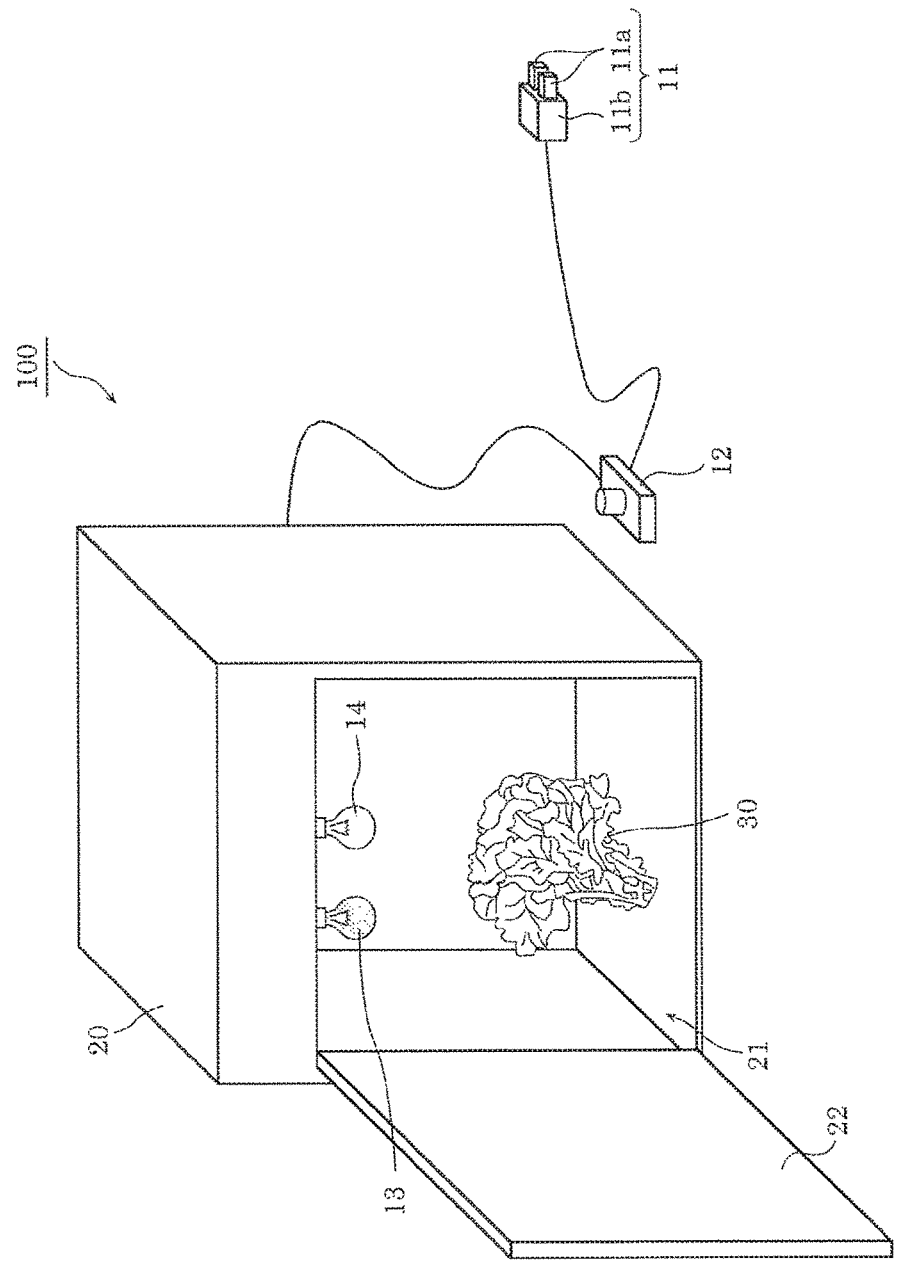
FIG. 1 is an external perspective view of a repository according to Embodiment 1.

The following describes a freshness preservation device and the related technologies, according to exemplary embodiments of the present disclosure with reference to the drawings. The exemplary embodiments described below illustrate general or specific examples of the present disclosure. The numerical values, shapes. Materials, elements, the arrangement and connection of the elements, steps, and order of the steps, etc., in the following exemplary embodiments are merely examples, and therefore are not intended to limit the inventive concept. Therefore, among the elements in the following exemplary embodiments, those not recited in any of the independent claims defining the most generic part of the inventive concept are described as arbitrary elements.

Note that the drawings are represented schematically and are not necessarily precise illustrations. Moreover, elements that are essentially the same share like reference numerals. As such, duplicate descriptions thereof may be omitted or abridged.

Embodiment 1

(Repository Configuration)

Figure 2:
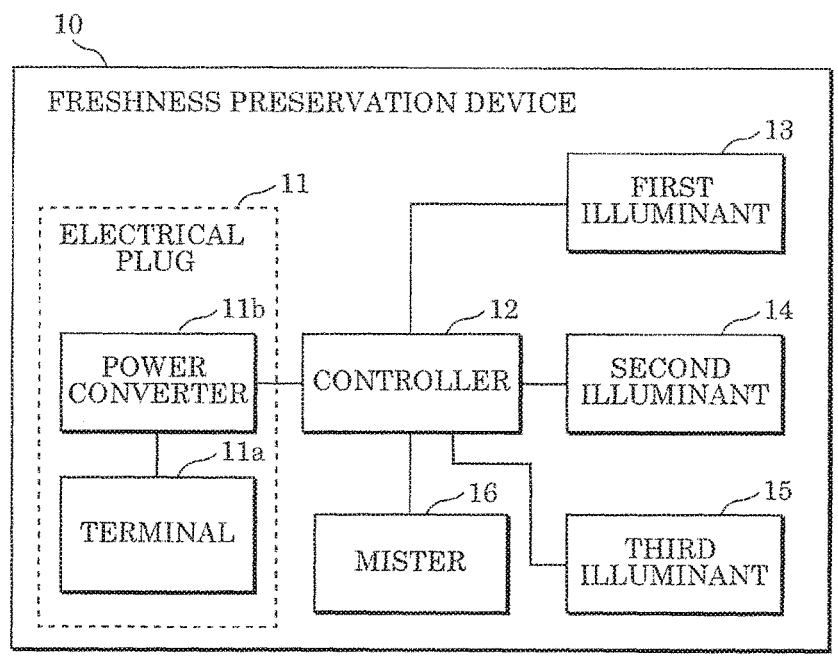
FIG. 2 is a block diagram illustrating the functional configuration of a freshness preservation device including the repository according to Embodiment 1.

First the configuration of a repository according to Embodiment 1 will be described. FIG. 1 is an external perspective view of the repository according to Embodiment 1. FIG. 2 is a block diagram illustrating the functional configuration of a freshness preservation device including the repository according to Embodiment 1.

Repository 100 illustrated in FIG. 1 houses (stores) harvested crop 30, and is installed in, for example, a storage room of a store that sells crop 30. Repository 100 includes housing 20, door 22, and freshness preservation device 10.

Housing 20 is substantially cuboid in outer form, and crop 30 can be inserted in and removed from storage space 21, which is a cuboid space inside housing 20, via the front of storage space 21. Housing 20 is, for example, made from metal such as aluminum, but may be made from resin. Note that the above shape and material of housing 20 are merely examples; the shape and material of housing 20 are not limited to these examples.

Door 22 (cover) can be opened and closed, and is provided in front of storage space 21. When door 22 is closed and first illuminant 13, second illuminant 14, and third illuminant 15 are turned off, storage space 21 is dark (an environment of 0 lux).

Freshness preservation device 10 is for preserving the freshness of a harvested crop 30. As illustrated in FIG. 1 and FIG. 2, freshness preservation device 10 includes electrical plug 11, controller 12, first illuminant 13, second illuminant 14, third illuminant 15, and mister (sprayer or atomizer) 16.

Electrical plug 11 is one example of an electricity receiver, and includes terminal 11*a* and power converter 11*b*. Electrical plug 11 is what is commonly referred to as an AC adapter.

Terminal 11*a* is a metal terminal that plugs into an electrical outlet. Terminal 11*a* is not limited to any particular shape or material.

Power converter 11*b* converts the AC power received by terminal 11*a* into DC power, and supplies the converted. DC power to controller 12, first illuminant 13, second illuminant 14, third illuminant 15, and mister 16. Specifically, power converter 11*b* is an AC-DC converter circuit. Note that in repository 100, power converter 11*b* is externally provided relative to housing 20, but power converter 11*b* may be provided internally in housing 20.

First illuminant 13 is a radiation device that is disposed above storage space 21, and, under control by controller 12, radiates blue light onto crop 30 stored in storage space 21 in a room temperature environment. Here, blue light is, for example, light having an emission peak (emission center wavelength) in a range from 420 nm to 470 nm, inclusive, and an overall emission spectrum in a range from 350 nm to less than 550 nm. More specifically, first illuminant 13 is a light-emitting module including a substrate and a plurality of blue LEDs mounted on the substrate, but may be implemented in any form that can emit blue light. Note that first illuminant 13 is schematically illustrated in FIG. 1, and its shape is not accurately depicted.

Note that the blue light (the emission spectrum of the blue light radiated by first illuminant 13 typically has one peak, but may have two or more peaks at mutually different wavelengths. For example, in one experiment, which will be described later, first illuminant 13 radiates monochromatic blue light whose peak wavelength is 450 nm.

Second illuminant 14 is a radiation device that is disposed above storage space 21, and, under control by controller 12, radiates infrared light onto crop 30 stored in storage space 21 in a room temperature environment. Here, infrared light is, for example, near infrared light having an emission peak (emission center wavelength) in a range from 700 nm to 2500 nm, inclusive, but the infrared light is not particularly limited to this example. More specifically, second illuminant 14 is a light-emitting module including a substrate and a plurality of infrared LEDs mounted on the substrate, but may be implemented in any form that can emit infrared light. Note that second illuminant 14 is schematically illustrated in FIG. 1, and its shape is not accurately depicted.

Note that the infrared light (the emission spectrum of the infrared light) radiated by second illuminant 14 typically has one peak, but may have two or more peaks at mutually different wavelengths.

Note that second illuminant 14 may radiate red light onto crop 30 stored in storage space 21 in a room temperature environment under control by controller 12. Here, red light is, for example, light having an emission peak (emission center wavelength) in a range from 610 nm to 670 nm, inclusive, and an overall emission spectrum in a range from 400 nm to less than 700 nm. More specifically, second illuminant 14 that radiates red light is a light-emitting module including a substrate and a plurality of red LEDs mounted on the substrate.

Third illuminant 15 is a radiation device that is disposed above storage space 21, and, under control by controller 12, radiates white light onto crop 30 stored in storage space 21. More specifically, third illuminant 15 irradiates crop 30 with white light while first illuminant 13 irradiates crop 30 with blue light. For example, the white light has an overall emission spectrum in a range from 350 nm to less than 700 nm.

Third illuminant 15 is, for example, a chip-on-board (COB) light-emitting module including a substrate, a plurality of blue LEDs directly mounted on the substrate, and a sealant that contains yellow phosphor particles and seals the plurality of blue LEDs. Note that third illuminant 15 may be a surface mount device (SMD) light-emitting module and, alternatively, may be a remote phosphor light-emitting module. Third illuminant 15 may be implemented in any form that can emit white light. Note that third illuminant 15 is schematically illustrated in FIG. 1, and its shape is not accurately depicted.

Note that first illuminant 13, second illuminant 14, and third illuminant 15 may be configured as a single unit. Such a single unit is, for example, a light-emitting module including a substrate on which three types of light-emitting elements—LED elements that emit white light, blue LEDs, and red LEDs—are mounted. Moreover, such a single unit may be, for example, a light-emitting module that emits white light whose blue component is significantly increased and has infrared components added thereto.

Mister (sprayer or atomizer) 16 mists crop 30 with water while first illuminant 13 irradiates crop 30 with blue light. Specifically, mister 16 is a two-fluid misting device. Two-fluid refers to atomizing water by bombarding the water with high velocity, compressed gas to generate a mist whose droplets have a diameter of a few micrometers. Note that mister 16 may be a high-pressure one-fluid misting device, and may be an ultrasonic misting device. Although not shown in detail in the drawings, note that mister 16 is supplied with water from water supply tank 23.

Water is misted in order to supply crop 30 with water via the pores of crop 30. Thus, the droplets of the water misted by mister 16 are preferably smaller in diameter than the pores, and specifically may have a microscopic diameter of 10 μm or less. The droplets of the water misted by mister 16 may preferably have a diameter of 5 μm or less. The lower limit for the diameter of the water droplets is not particularly limited, but is, for example, 1 μm or more.

Controller 12 controls first illuminant 13, second illuminant 14, third illuminant 15, and mister 16 in accordance with an input made by a user. For example, controller 12 controls the intensity and the radiation time of the blue light radiated by first illuminant 13. For example, controller 12 also controls on/off of radiation of light by first illuminant 13, second illuminant 14, third illuminant 15, and mister 16. Controller 12 may control the intensity of the white light radiated by third illuminant 15.

More specifically, controller 12 is configured of, for example, a PWM control circuit (light dimming circuit) for controlling the illuminance of first illuminant 13, a timer circuit for controlling the radiation time of first illuminant 13, and a control circuit for controlling on/off of mister 16.

Controller 12 may be configured as a processor or a microcomputer. Note that in repository 100, controller 12 is externally provided relative to housing 20, but part or all of controller 12 may provided internally in housing 20.

In some embodiments, controller 12 is not utilized. In other embodiments, freshness preservation device 10 preferably includes controller 12. Moreover, the controller for controlling the intensity of the blue light and the controller for controlling the radiation time of the blue light may be provided as separate controllers. The controller for controlling first illuminant 13, second illuminant 14, and third illuminant 15 and the controller for controlling mister 16 may be provided as separate controllers. Moreover, controller 12 may be integrally provided with first illuminant 13, second illuminant 14, third illuminant 15, and mister 16. Controller 12 is not particularly limited to any specific example but may include a CPU and a memory storing a program to control the controller.

Note that repository 100 may include a cooling device that cools storage space 21. In other Words, repository 100 may be a refrigerator, but repository 100 according to Embodiment 1 does not include a cooling device. Stated differently, repository 100 does not necessarily control the environmental temperature of storage space 21 (the area around crop 30).

Moreover, when repository 100 includes a large storage space 21, crops 30 may be placed on a belt conveyor and the belt conveyor may be ran to sequentially bring crops 30 to a position directly below first illuminant 13 to be irradiated with light and misted with water. In other words, crops 30 may be irradiated with light and misted with water while being transported in a transportation direction on a belt conveyor.

(Operation 1 Performed by Freshness Preservation Device)

Figure 3:
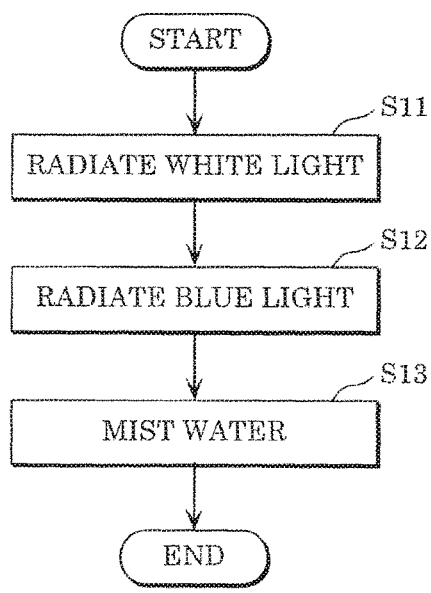
FIG. 3 is a flow chart of operation 1 performed by the freshness preservation device according to Embodiment 1.

Next, operation 1 performed by freshness preservation device 10 (the method of preserving freshness) will be described. FIG. 3 is a flow chart of operations performed by freshness preservation device 10.

In a state in which a harvested crop 30 is stored in storage space 21, under control by controller 12, third illuminant 15 radiates white light onto crop 30 stored in storage space 21 (S11). In other words, controller 12 of freshness preservation device 10 causes third illuminant 15 to radiate white light. In some embodiments, the radiation of white light is not utilized.

Next, in a state in which third illuminant 15 is radiating white light, under control by controller 12, first illuminant 13 radiates blue light onto crop 30 stored in storage space 21 (S12). In other words, controller 12 of freshness preservation device 10 causes first illuminant 13 to radiate blue light. The radiation of blue light is stopped after, for example, 30 minutes or less of radiation.

Under control by controller 12, mister 16 mists crop 30 with water while first illuminant 13 irradiates crop 30 with blue light (S13). In other words, controller 12 of freshness preservation device 10 causes mister 16 to mist water. Mister 16 may mist water throughout the time blue light is being radiated and, alternatively, may mist water during part of the time blue light is being radiated.

EXPERIMENT 1

As described in the deception of operation 1 above, freshness preservation device 10 radiates harvest crop 30 with blue light and mists harvested crop 30 with water while harvested crop 30 is being irradiated with blue light. With this, freshness preservation device 10 can reduce a reduction in freshness of crop 30. Next, experiments performed using freshness preservation device 10 will be described.

In Experiment 1, spinach was used as crop 30. In Experiment 1, in an environment in which spinach is irradiated with white light by third illuminant 15 at 800 lux, the spinach was left and subjected to the following three conditions, and the change in water retention was measured.

Condition (1): radiating monochromatic blue light having a peak wavelength of 450 nm for 30 minutes and misting water for 30 minutes.

Condition (2): radiating monochromatic blue light having a peak wavelength of 450 nm for 10 minutes and misting water for 10 minutes.

Condition (3): not radiating monochromatic blue light and not misting water.

Figure 4:
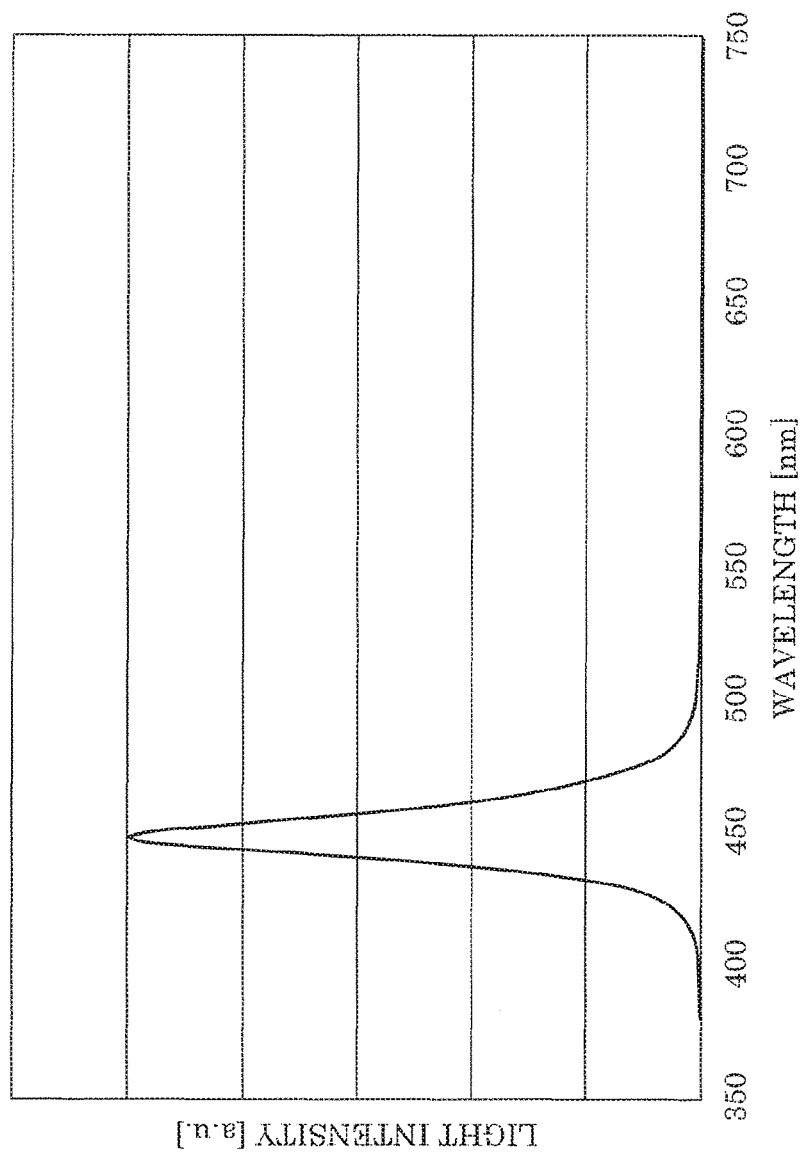
FIG. 4 illustrates the emission spectrum of blue light having a peak wavelength of 450 nm.

Note that the emission spectrum of the monochromatic blue light having a peak wavelength of 450 nm (hereinafter also referred to simply as "450 nm blue light") is shown in FIG. 4. FIG. 4 illustrates the emission spectrum of monochromatic blue light having a peak wavelength of 450 nm. Note that the blue light peak wavelength presented here is merely one example; the peak wavelength of blue light is not particularly limited.

More specifically, Experiment 1 was conducted under the following conditions: temperature of 20 degrees Celsius or less; humidity of 80% or less; and a blue light photon flux density (intensity of radiation) of 0.5 $\mu mol \cdot m^{-2} \cdot s^{-1}$. The mist of water generated by mister 16 is composed of microscopic droplets having a diameter of roughly a few µm (10 µm or less).

Water retention was calculated with the following formula.

$$\text{Water retention (\%)} = (\text{weight after elapse of storage time/weight before irradiation with light and misting}) \times 100$$

Figure 5:
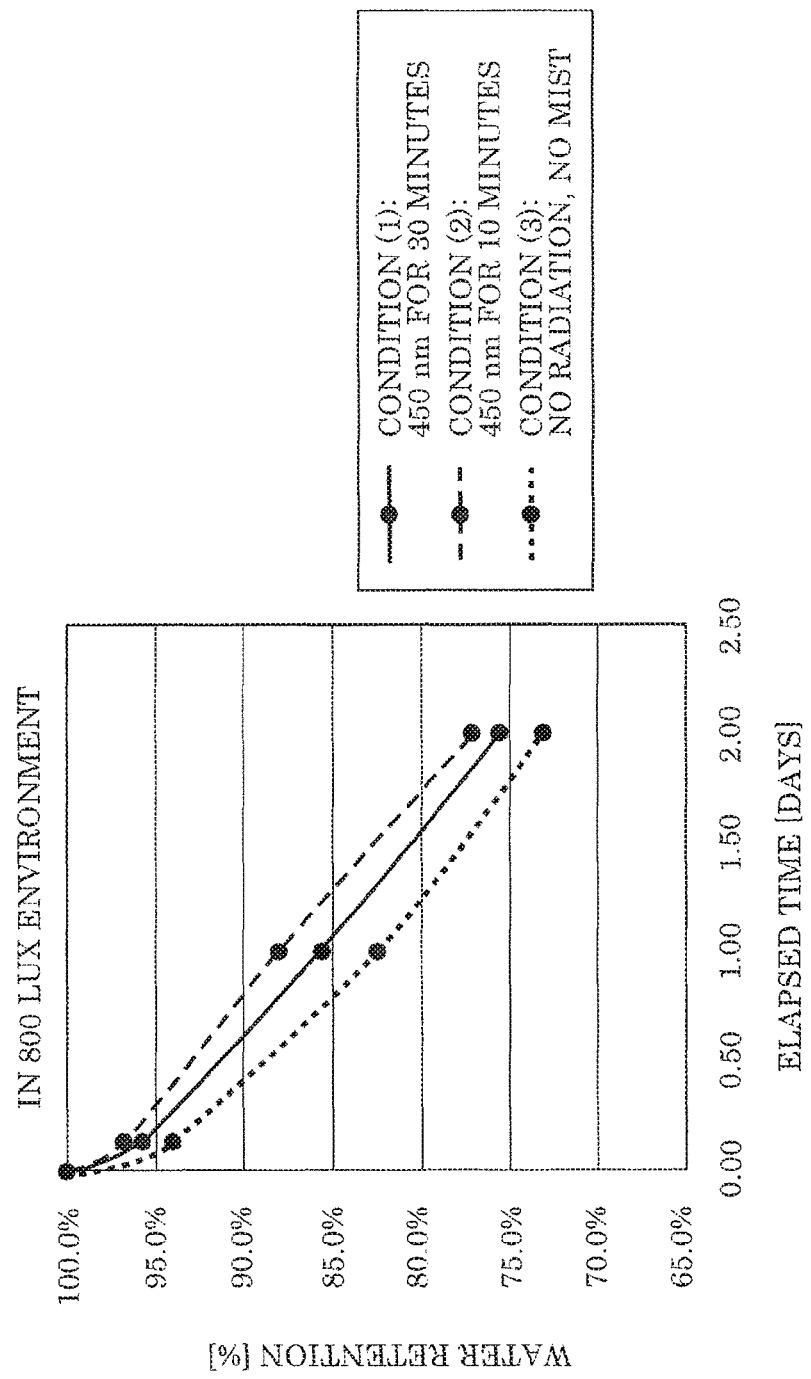
FIG. 5 illustrates the results of Experiment 1.

Note that in Experiment 1, under each condition, water retention was calculated for units of spinach n=2 to 3, and the averages of the calculated water retentions are plotted in FIG. 5.

FIG. 5 illustrates the results of Experiment 1. As illustrated in FIG. 5, after subjecting the spinach for 1 day and 2 days, water retention was highest under Condition 2, second highest under Condition 1, and third highest under condition (3). In other words, the radiation of blue light and the misting of water reduced a reduction in water retention (freshness). Moreover, irradiating the spinach with blue light and misting the spinach with water for 10 minutes more greatly reduced a reduction in water retention (freshness) than irradiating the spinach with blue light and misting the spinach with water for 30 minutes.

Note that the reason why a reduction in water retention of crop 30 can be reduced by irradiating crop 30 with blue light and misting crop 30 with water is unclear. Here, since it is known that the pores of crop 30 open when crop 30 is irradiated with blue light, rehydration via the pores of crop 30 by misting crop 30 with water while irradiating crop 30 with blue light is believed to be one reason.

EXPERIMENT 2

Figure 6:
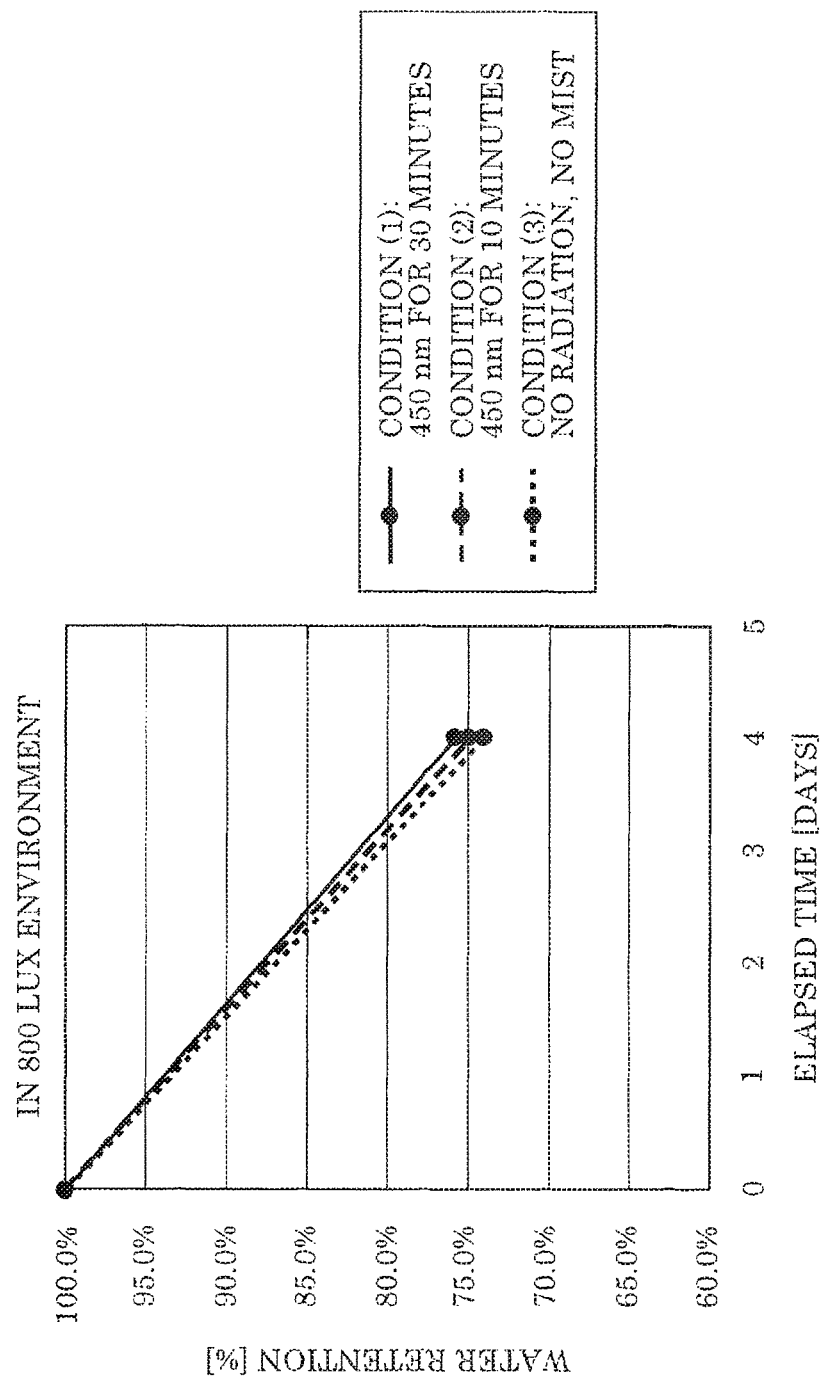
FIG. 6 illustrates the results of Experiment 2.

In Experiment 2, strawberries were used as crop 30. All other conditions were the same as with Experiment 1. FIG. 6 illustrates the results of Experiment 2.

As illustrated in FIG. 6, after subjecting the strawberries for 4 days, water retention was highest under Condition 1, second highest under Condition 2, and third highest under Condition 3. In other words, the radiation of blue light and the misting of water reduced a reduction in water retention (freshness). Moreover, irradiating the strawberries with blue light and misting the strawberries with water for 30 minutes more greatly reduced a reduction in water retention (freshness) than irradiating the strawberries with blue light and misting the strawberries with water for 10 minutes.

(Operation 2 Performed by Freshness Preservation Device)

Figure 7:
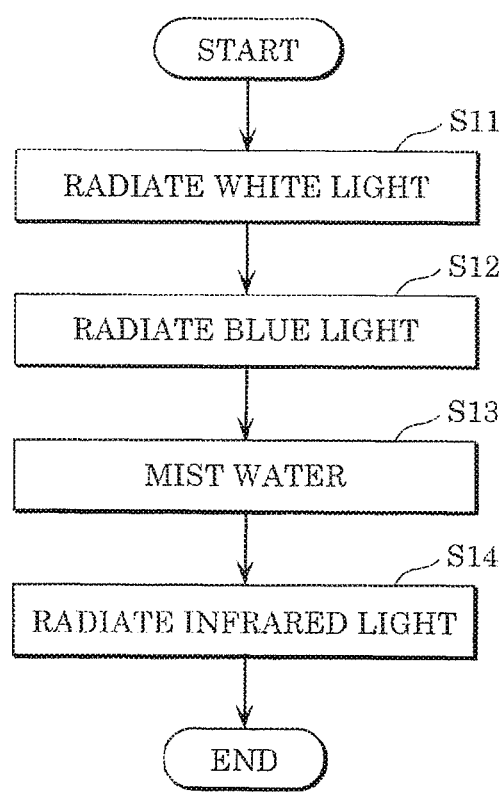
FIG. 7 is a flow chart of operation 2 performed by the freshness preservation device according to Embodiment 1.

Next, operation 2 performed by freshness preservation device 10 (the method of preserving freshness) will be described. FIG. 7 is a flow chart of operations performed by freshness preservation device 10.

As illustrated in FIG. 7, in the flow chart for operation 2, after the radiating of blue light and the misting of water, infrared light is radiated by second illuminant 14 (S14). With this, as illustrated in the following experiment results, it is possible to further reduce a reduction in water retention of crop 30.

EXPERIMENT 3

In Experiment 3, strawberries were used as crop 30. In Experiment 3, in an environment in which strawberries are irradiated with white light by third illuminant 15 at 800 lux, the strawberries were left and subjected to the following two conditions, and the change in water retention was measured.

Condition (1): radiating monochromatic blue light having a peak wavelength of 450 nm for 10 minutes and ting water for 10 minutes. Afterward, infrared light was not radiated.

Condition (2): radiating monochromatic blue light having a peak wavelength, of 450 nm for 10 minutes and misting water for 10 minutes. Afterward, infrared light having a peak wavelength of 735 nm was radiated for 60 minutes.

Figure 8:
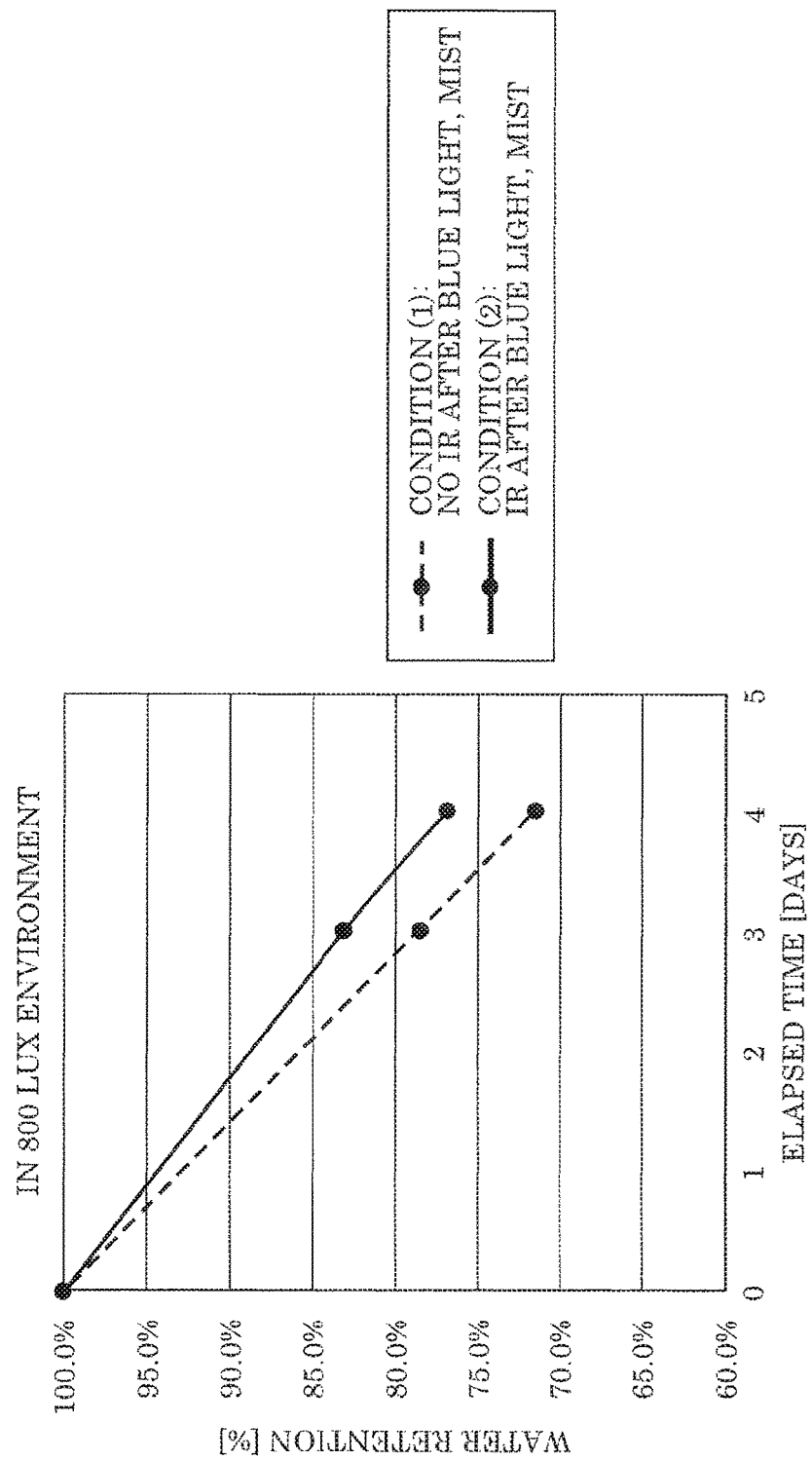
FIG. 8 illustrates the results of Experiment 3.

More specifically, Experiment 3 was conducted under the following conditions: temperature of 20 degrees Celsius or less; and humidity of 80% or less. Note that in Experiment 3, under each condition, water retention was calculated for a number of strawberries n=2 to 3, and the averages of the calculated water retentions are plotted in FIG. 8. FIG. 8 illustrates the results of Experiment 3.

As illustrated in FIG. 8, after subjecting the strawberries for 3 days and 4 days, water retention was highest under Condition 2, and second highest under Condition 1. In other words, radiating the strawberries with infrared light after radiating the strawberries with blue light and misting the strawberries with water further reduced a reduction in water retention.

Note that the reason why a reduction in water retention of crop 30 can be reduced by irradiating crop 30 with infrared light after irradiating crop 30 with blue light and misting crop 30 with water is unclear. Here, since it is known that the pores of crop 30 open when crop 30 is irradiated with blue light, it is presumed that the radiation of infrared light thereafter narrows the pores of crop 30 which reduces transpiration.

EXPERIMENT 4

Figure 9:
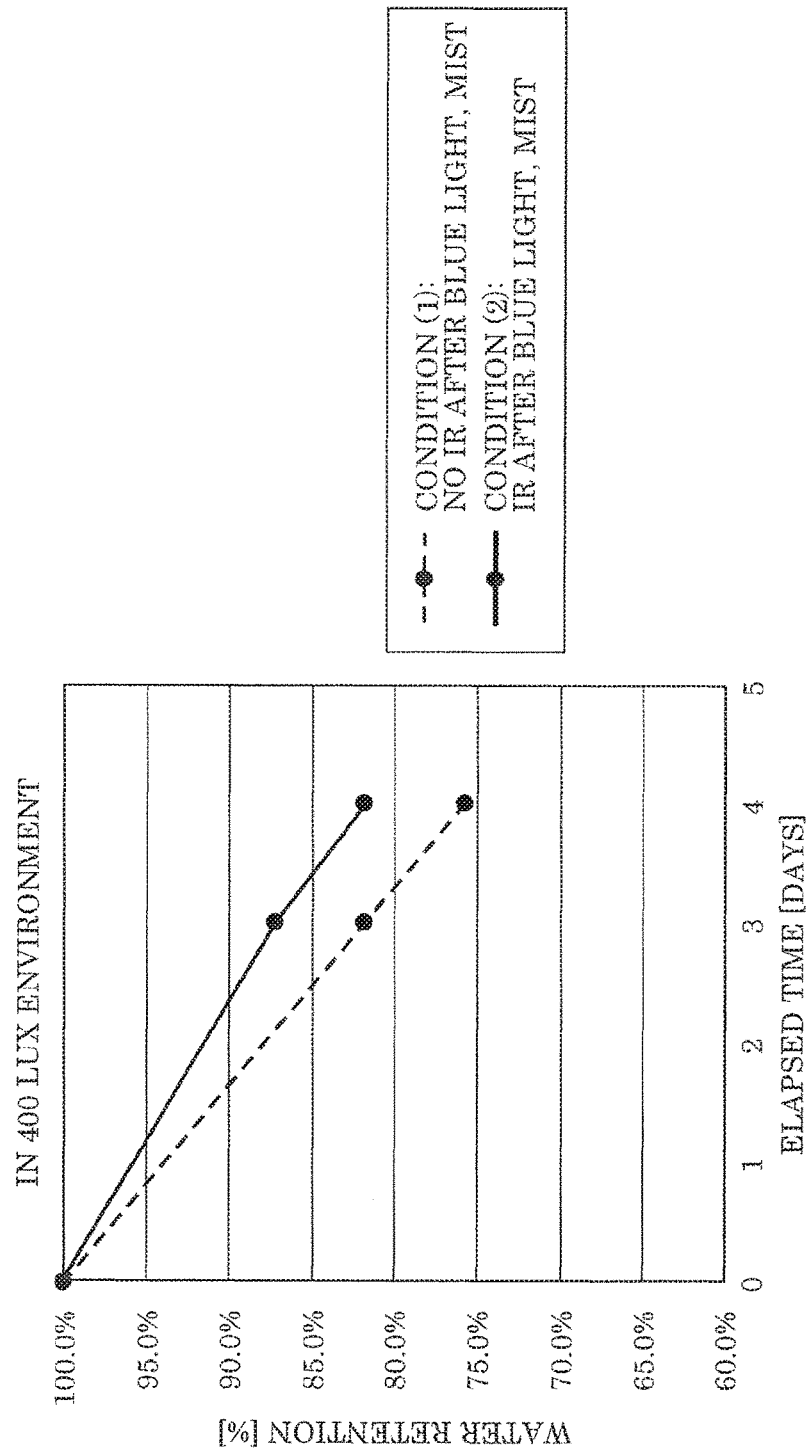
FIG. 9 illustrates the results of Experiment 4.

Experiment 4 was performed in an environment of 400 lux achieved by irradiating strawberries with white light by third illuminant 15. All other conditions were the same as with Experiment 3. FIG. 9 illustrates the results of Experiment 4.

As illustrated in FIG. 9, after subjecting the strawberries for 3 days and 4 days, water retention was highest under Condition 2, and second highest under Condition 1. In other words, radiating the strawberries with infrared light after radiating the strawberries with blue light and misting the strawberries with water further reduced a reduction in water retention.

(Additional Information on Experiments)

In Experiments 1 through 4 described above, the photon flux density of the blue light was 0.5 $\mu mol \cdot m^{-2} \cdot s^{-1}$, but so long as the photon flux density of the blue light is in a range from 0.1 $\mu mol \cdot m^{-2} \cdot s^{-1}$ to 10 $\mu mol \cdot m^{-2} \cdot s^{-1}$, inclusive, a reduction in water retention can be reduced. Moreover, even when the photon flux density of the blue light is less than 0.1. $\mu mol \cdot m^{-2} \cdot s^{-1}$ or greater than 10 $\mu mol \cdot m^{-2} \cdot s^{-1}$, compared to when blue light is not radiated and water is not misted, a certain degree of freshness preservation can be achieved.

Moreover, in Experiments 1 through 4 described above, the blue light was radiated for 10 minutes or 30 minutes, but radiating the blue light for 30 minutes or less will reduce a reduction in water retention. The blue light may be radiated in a range from 1 minute to 30 minutes, inclusive. Moreover, even in cases where the blue light is radiated for longer than 30 minutes, compared to when the blue light is not radiated, a certain degree of freshness preservation can be achieved.

Moreover, in Experiments 1 through 4 described above, the blue light had a peak wavelength of 450 nm, but blue light having a peak wavelength in a range between 445 nm and 455 nm, inclusive, will yield similar freshness preservation results to the results of the experiment performed when the blue light had a peak wavelength of 450 nm.

Moreover, in Experiments 3 and 4 described above, the radiation time of the infrared, light was 60 minutes, but an infrared light radiation time may be less than 60 minutes and, alternatively, may be more than 60 minutes.

Moreover, in Experiments 3 and 4 described above, the infrared light had a peak wavelength of 735 nm, but infrared light having a peak wavelength in a range between 730 nm and 740 nm, inclusive, will yield similar freshness preservation results to the results of the experiment performed when the infrared light had a peak wavelength of 735 nm.

Figure 10:
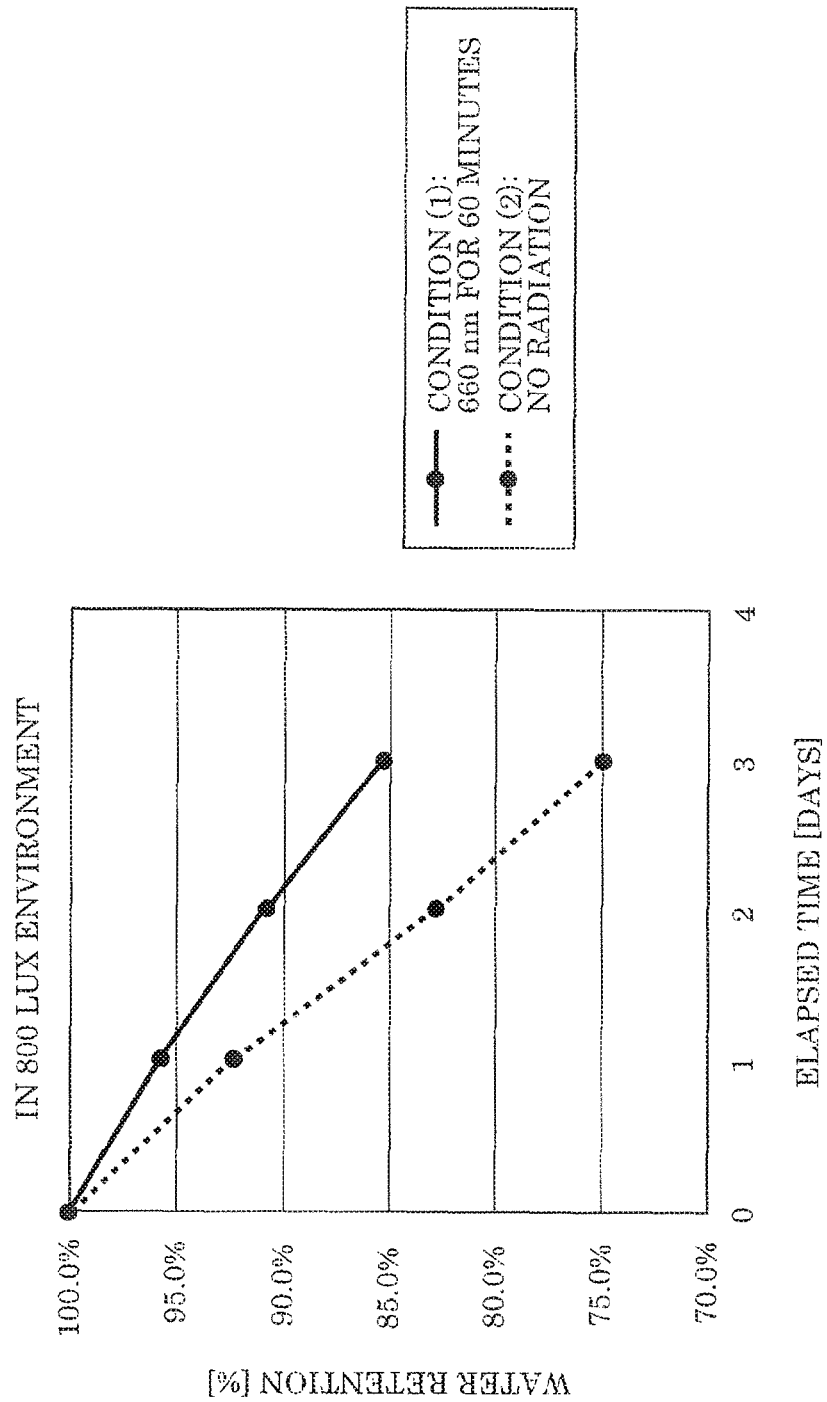
FIG. 10 illustrates the change in water retention when the crop is irradiated with red light.

Note that in Experiments 3 and 4 described above, crop 30 was irradiated with infrared light after crop 30 was irradiated with blue light and misted with water, but second illuminant 14 may irradiate crop 30 with red light instead of infrared light. As illustrated in FIG. 10, even if crops 30 (specifically, strawberries) are irradiated with 660 nm red light in an 800 lux environment (condition (1) in FIG. 10), a reduction in water retention of crop 30 can be reduced more so than when red light is not radiated (condition (2) in FIG. 10). FIG. 10 illustrates the change in water retention when the crop is irradiated with red light. In the experiment that yielded the results illustrated in FIG. 10, blue light was not radiated and water was not misted.

The reason why such results were obtained in FIG. 10 is unclear, but it is presumed to be because the radiation of red light causes the pores of crop 30 to narrow which reduces transpiration. Based on this presumption, even if crop 30 is irradiated with red light instead of infrared light after irradiating crop 30 with blue light and misting crop 30 with water, it is believed that a reduction in water retention of crop 30 can be reduced.

(Advantageous Effects, etc.)

As described above, the method of freshness preservation performed by repository 100 or freshness preservation device 10 is a method of preserving the freshness of a harvested crop 30, and includes irradiating harvested crop 30 with blue light, and misting harvested crop 30 with water mist while irradiating harvested crop 30 with blue light.

This sort of method of preserving freshness is capable of reducing a reduction in water retention of crop 30, as shown in the above experimentation results. In other words, the freshness of crop 30 can be preserved with a method that is different from refrigeration.

Moreover, with the method of preserving freshness described above, in a room temperature environment, if one crop 30 is irradiated with blue light and misted with water one time, no special treatment is required thereafter. In other words, according to freshness preservation device 10, repository 100, and the method of preserving freshness described above, a reduction in water retention of crop 30 can be easily reduced.

Moreover, in the method of preserving freshness described, above, harvested crop 30 may be irradiated with one of infrared light and red light after irradiating harvested crop 30 with the blue light and misting harvested crop 30 with the water mist.

With this, a reduction in water retention of crop 30 can be reduced, as shown in the above experimentation results.

Moreover, in the method of preserving freshness described above, harvested crop 30 may be irradiated with white light while irradiating harvested crop 30 with the blue light.

In this way, with the method of preserving freshness described above, it is possible to reduce a reduction in water retention of crop 30 even in an environment in which crop 30 is illuminated by white light by irradiating crop 30 with blue light and misting crop 30 with water.

Moreover, the photon flux density of the blue light may be in a range from 0.1 $\mu mol \cdot m^{-2} \cdot s^{-1}$ to 10 $\mu mol \cdot m^{-2} \cdot s^{-1}$, inclusive.

In this way, with the method of preserving freshness described above, it is possible to reduce a reduction in water retention of crop 30 by irradiating crop 30 with blue light having a photon flux density that is in a range from 0.1 $\mu mol \cdot m^{-2} \cdot s^{-1}$ to 10 $\mu mmol \cdot m^{-2} \cdot s^{-1}$, inclusive.

Moreover, the blue light may be radiated for a radiation time of 30 minutes or less.

In this way, with the method of preserving freshness described above, it is possible to reduce a reduction in water retention of crop 30 by irradiating crop 30 with blue light, for 30 minutes or less.

Moreover, the blue light may have an emission spectrum in a range from 350 nm to 550 nm, inclusive.

In this way, with the method of preserving freshness described above, it is possible to reduce a reduction in water retention of crop 30 by irradiating crop 30 with blue light having an emission spectrum in a range from 350 nm to 550 nm, inclusive.

Moreover, droplets of the water mist may have a diameter of 10 μm or less.

Since this makes it easier for moisture to enter the pores of crop 30, the method of preserving freshness described above makes it possible to reduce a reduction in water retention of crop 30.

Moreover, harvested crop 30 may be one of a vegetable, a fruit, and a flowering plant.

In this way, the method of preserving freshness described above can reduce a reduction in water retention of crop 30 that is a vegetable, fruit, or flowering plant. In other words, the method of preserving freshness described above can reduce a reduction in water retention of a wide variety of crops 30.

Freshness preservation device 10 is for preserving the freshness of a harvested crop 30, and includes first illuminant 13 that irradiates harvested crop 30 with blue light; and mister 16 that mists harvested crop 30 with water mist while first illuminant 13 irradiates harvested crop 30 with the blue light.

With this, freshness preservation device 10 can reduce a reduction in water retention of crop 30. In other words, the freshness of crop 30 can be preserved with a method that is different from refrigeration.

Moreover, freshness preservation device 10 may further include controller 12 that controls at least one of an intensity and a radiation time of the blue light radiated by first illuminant 13.

With this, freshness preservation device 10 can control at least one of an intensity and a radiation time of the blue light radiated by first illuminant 13.

Moreover, freshness preservation device 10 may further include second illuminant 14 that irradiates harvested crop 30 with one of infrared light and red light after first illuminant 13 irradiates harvested crop 30 with the blue light and mister 16 mists harvested crop 30 with the water mist.

With this, freshness preservation device 10 can further reduce a reduction in water retention of crop 30, as shown in the above experimentation results.

Moreover, freshness preservation device 10 may further include third illuminant 15 that irradiates harvested crop 30 with white light while first illuminant 13 irradiates harvested crop 30 with the blue light.

With this, freshness preservation device 10 can irradiate crop 30 with white light (light for illumination purposes).

Repository 100 includes freshness preservation device 10 and housing 20 that houses harvested crop 30.

With this, repository 100 can house crop 30 and reduce a reduction in water retention of crop 30.

Embodiment 2

(Configuration)

Figure 11:
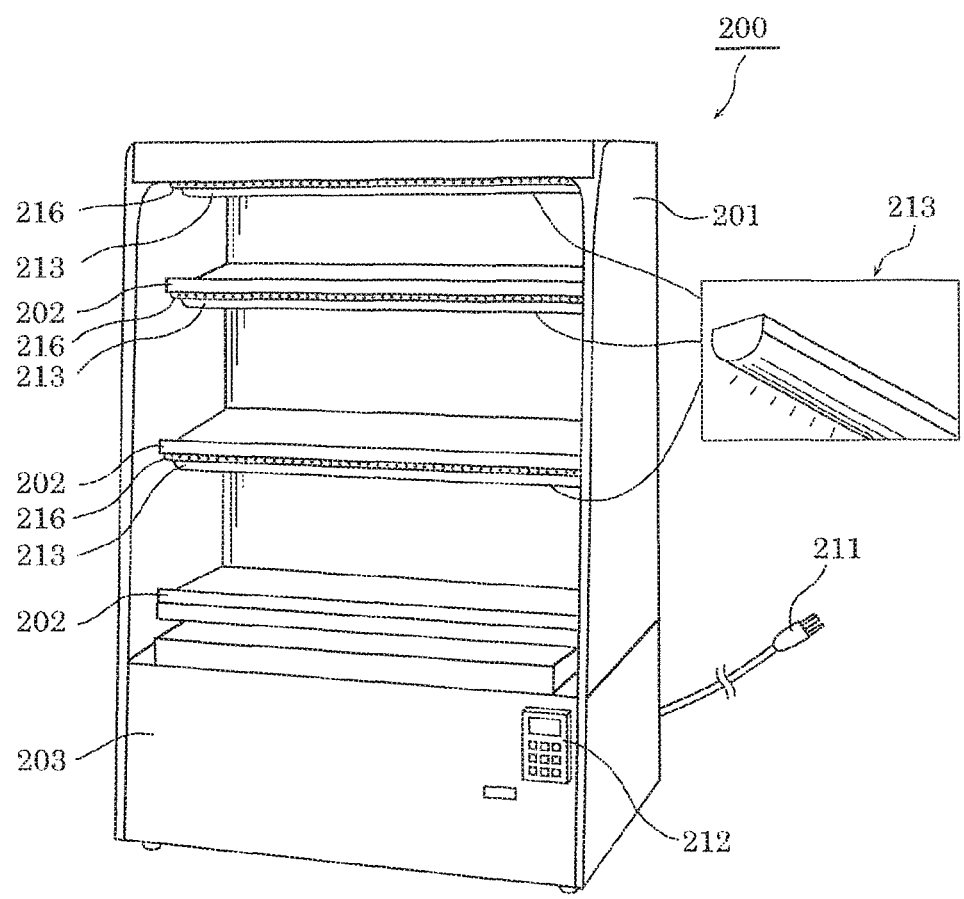
FIG. 11 is an external perspective view of a display device according to Embodiment 2.
Figure 12:
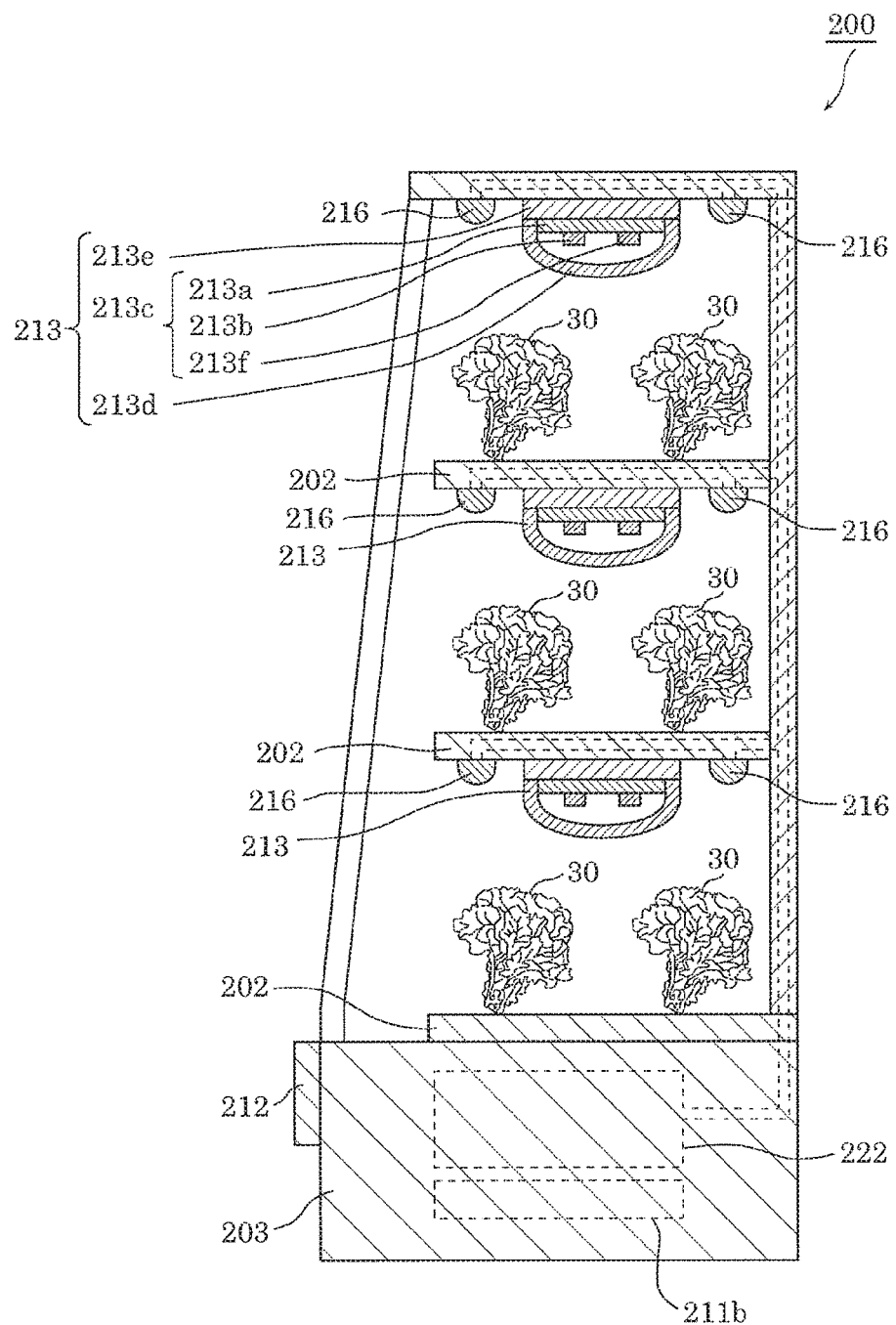
FIG. 12 is a schematic cross section of the display device according to Embodiment 2 when viewed from the side.
Figure 13:
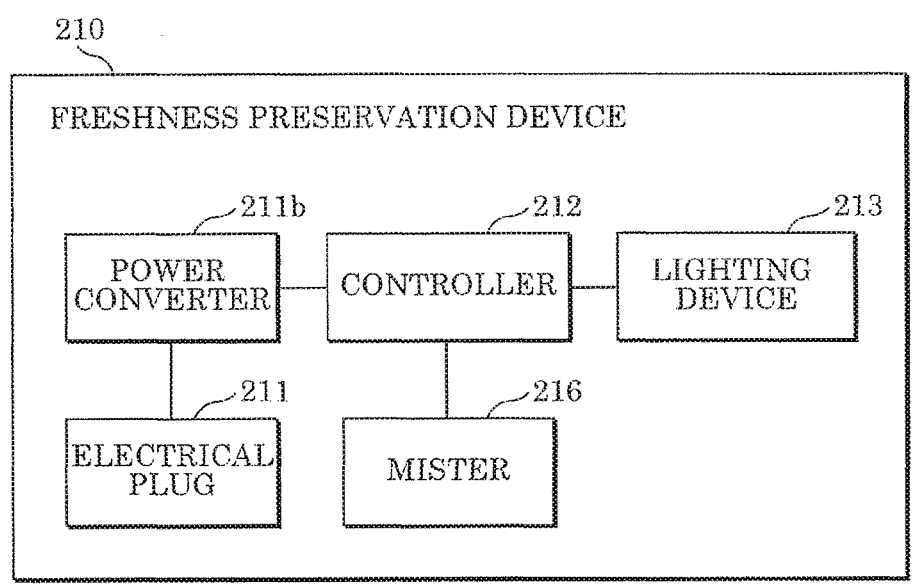
FIG. 13 is a block diagram illustrating the functional configuration of a freshness preservation device including the display device according to Embodiment 2.

Next, as Embodiment 2, a display device including the freshness preservation device will be described. FIG. 11 is an external perspective view of the display device according to Embodiment 2. FIG. 12 is an external perspective of a schematic cross section of the display device according to Embodiment 2 when viewed from the side. FIG. 13 is a block diagram illustrating the functional configuration of a freshness preservation device including the display device according to Embodiment 2 (hereinafter also referred to as the freshness preservation device according to Embodiment 2.

Display device 200 illustrated in FIG. 11 and FIG. 12 includes a plurality of shelves 202 on which harvested crops 30 are displayed (placed), and is installed, for example, on the sales floor of a store that sells crops 30. Display device 200 includes main body 201, shelves 202, base 203, and freshness preservation device 210.

Main body 201 defines the space where crops 30 are stored. Main body 201 includes a side panel, a roof panel, a back panel, and a frame that holds the panels. Main body 201 has an open front. Specifically, main body 201 is made from metal such as aluminum or iron, and resin.

Shelves 202 are plate-shaped components that divide the space defined by main body 201. Harvested crops are displayed on the top surfaces of shelves 202. Main body 201 includes three shelves 202. Specifically, shelves 202 are made from metal such as aluminum or iron, but may be made from resin.

Base 203 acts as the base for display device 200, and controller 212 included in freshness preservation device 210 to be described later is attached to base 203. Moreover, power converter 211b included in freshness preservation device 210 is housed inside base 203.

Next, freshness preservation device 210 will be described with reference to FIG. 13 in addition to FIG. 11 and FIG. 12.

As illustrated in FIG. 11 through FIG. 13, freshness preservation device 210 includes electrical plug 211, power converter 211b, controller 212, lighting device 213, and mister 216.

Electrical plug 211 is one example of an electricity receiver, and has a metal terminal that plugs into an electrical outlet. Electrical plug 211 receives AC power from the terminal.

Power converter 211b converts the AC power received by electrical plug 211 into DC power, and supplies the converted DC power to controller 212 and lighting device 213. Specifically, power converter 211b is an AC-DC converter circuit. Note that in display device 200, power converter 211b is installed internally in base 203.

Controller 212 controls lighting device 213 in accordance with an input made by a user. For example, controller 212 controls the intensity and the radiation time of the blue light radiated by lighting device 213. For example, controller 212 also controls on/off of radiation of light by lighting device 213.

More specifically, controller 212 is configured of, for example, a PWM control circuit (light dimming circuit) for controlling the illuminance of lighting device 213, and a timer circuit for controlling the radiation time of lighting device 213. Controller 212 may be configured as a processor or a microcomputer.

Lighting device 213 is disposed above each shelf 202, and, under control by controller 212, radiates blue light and infrared light onto crops 30 displayed on shelf 202. In other words, lighting device 213 functions as both the first illuminant and the second illuminant. As illustrated in FIG. 12, lighting device 213 includes: base 213e; light-emitting module 213c including blue LEDs 213b and infrared LEDs 213f, and substrate 213a on which blue LEDs 213b and infrared LEDs 213f are disposed; and diffusing cover 213d.

Base 213e functions as a base for attaching light-emitting module 213c, as a heat sink for light-emitting module 213c, and also as an attachment component for attaching lighting device 213 to shelf 202. Base 213e is, for example, made from metal such as die casted aluminum.

Diffusing cover 213d diffuses and transmits the blue light and infrared light emitted from light-emitting module 213c, whereby the blue light and infrared light is radiated onto crops 30.

Figure 14:
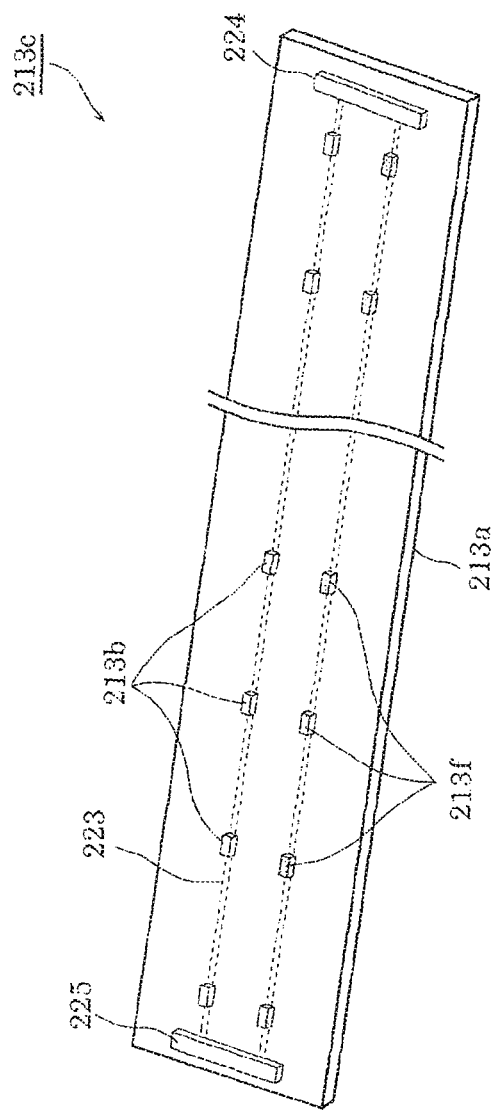
FIG. 14 illustrates the configuration of a light-emitting module in detail.

Light-emitting module 213c includes substrate 213a and blue LEDs 213b and infrared LEDs 213f mounted on substrate 213a. Hereinafter, the structure of light-emitting module 213c will be described in detail with reference to FIG. 14. FIG. 14 illustrates the configuration of the light-emitting module in detail.

As illustrated in FIG. 14, light-emitting module 213c includes, in more detail, substrate 213a, a plurality of blue LEDs 213b mounted in a single row on substrate 213a, a plurality of infrared LEDs 213f mounted in a single row on substrate 213a, line 223, connector 224, and connector 225.

Substrate 213a is an elongated rectangular substrate. Substrate 213a is a composite epoxy material-3 (CEM-3) substrate whose base material is resin, but substrate 213a may be a different resin substrate, a metal-based substrate, or a ceramic substrate. One example of a different resin substrate is a flame retardant-4 (FR-4) substrate. Examples of ceramic substrates include an alumina substrate and an aluminum nitride substrate. Examples of metal-based substrates include an aluminum alloy substrate, an iron alloy substrate, and a copper alloy substrate.

Blue LEDs 213b are one example of the light-emitting elements, and are bare chips that emit monochromatic visible light. Examples of blue LEDs 213b include blue LEDs made from an AlGaInP material. Blue LEDs 213b are, for example, die bonded to substrate 213a with a die attaching material (die boding material).

Infrared LEDs 213f are one example of the light-emitting elements, and are bare chips that emit infrared light. Examples of infrared LEDs 213f include infrared LEDs made from an AlGaInP material. Infrared LEDs 213f are, for example, die bonded to substrate 213a with a die attaching material (die boding material).

Line 223 is a metal line made from, for example, tungsten (W) or copper (Cu). Line 223 is formed in a predetermined pattern to electrically connect the plurality of blue LEDs 213b together as well as connect the plurality of blue LEDs 213b with connector 224 and connector 225. Similarly, line 223 is formed in a predetermined pattern to electrically connect the plurality of infrared LEDs 213f together as well as connect the plurality of infrared LEDs 213f with connector 224 and connector 225. Moreover, line 223 is formed in a predetermined pattern so as to allow for independent control of the plurality of blue LEDs 213b and the plurality of infrared LEDs 213f.

Note that in FIG. 14, line 22.3 connects the plurality of blue LEDs 213b physically arranged in a single line in series, and connects the plurality of infrared LEDs 213f physically arranged in a single line in series. However, the plurality of blue LEDs 213b physically arranged in a single line may be electrically arranged in a plurality of parallel-connected lines of a predetermined number of series-connected blue LEDs 213b. In other words, the plurality of blue LEDs 213b physically arranged in a single line may be electrically connected in this way by line 223. The same applies to the plurality of infrared LEDs 213f physically arranged in a single line.

Connector 224 and connector 225 are connectors for feeding electricity to light-emitting module 213c. DC power from controller 212 is fed to connector 224 or connector 225. This allows light-emitting module 213c to emit light.

Mister 216 mists crop 30 with water while the lighting device irradiates crop 30 with blue light. Specifically, similarly to mister 16, mister 216 is a two-fluid misting device, a high-pressure one-fluid misting device, or an ultrasonic misting device. Note that mister 216 is supplied with water from water supply tank 222 stored inside base 203.

(Advantageous Effects, etc.)

As described above, display device 200 includes freshness preservation device 210 and shelves 202 on which harvested crops 30 are displayed.

Display device 200 can reduce a reduction in freshness of harvested crops 30 by irradiating crops 30 with blue light and misting crops 30 with water. Display device 200 can further reduce a reduction in freshness of crops 30 by irradiating crops 30 with infrared light or red light after irradiating crops 30 with blue light and misting crops 30 with water. Moreover, display device 200 can reduce a reduction in water retention of crops 30 while displaying crops 30.

Note that here, display device 200 is assumed to be installed on the sales floor in a store, as described above. In other words, since display device 200 is used in an environment illuminated by white light, freshness preservation device 210 does not include the third illuminant. However, freshness preservation device 210 may include the third illuminant.

Figure 15:
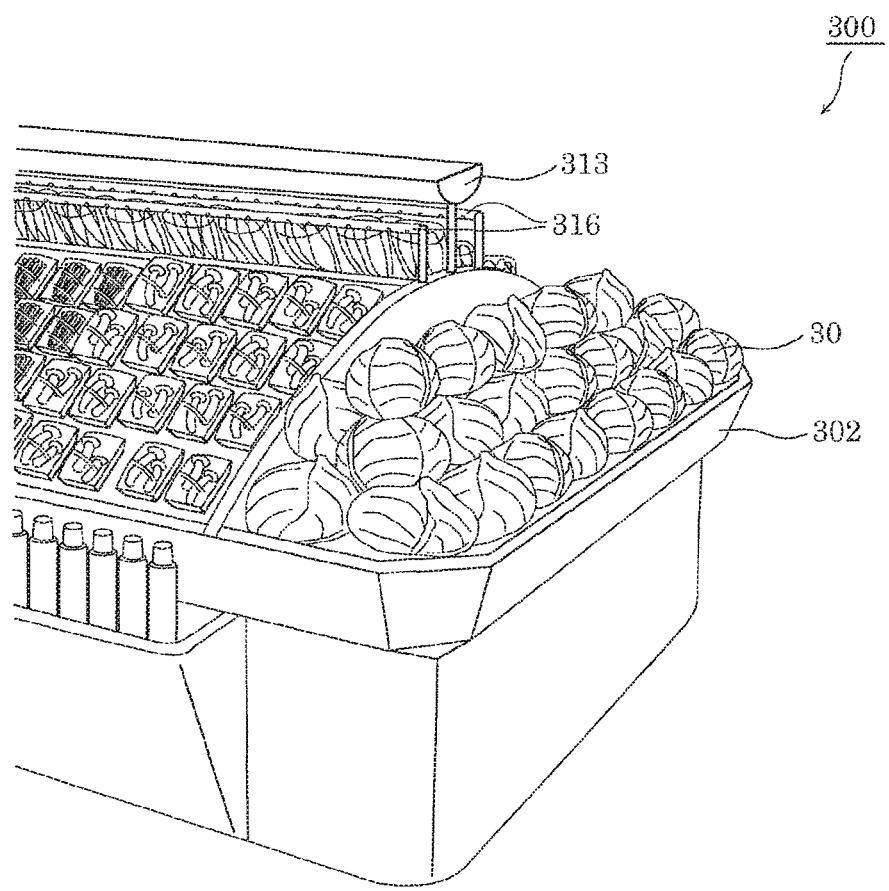
FIG. 15 is a schematic view of a display device according to a different embodiment.

Note that display device 200 is just one example. The present disclosure may be realized as display device 300 illustrated in FIG. 15, for example. FIG. 15 is a schematic view of display device 300 according to a different embodiment.

Lighting device 313 (freshness preservation device) included, in display device 300 irradiates crops 30 displayed on shelf 302 with blue light. Lighting device 313 has substantially the same configuration as lighting device 213. Moreover, mister 316 included in display device 300 mists crops 30 displayed on shelf 302 with water. Mister 316 has substantially the same configuration as mister 216.

Display device 300 can reduce a reduction in freshness of crops 30 by irradiating crops 30 with blue light and misting crop 30 with water. Display device 300 can reduce a reduction in freshness of crops 30 by irradiating crops 30 with infrared light or red light after irradiating crops 30 with blue light and misting crops 30 with water. Moreover, display device 300 can reduce a reduction in water retention of crops 30 while displaying crops 30.

(Additional Information for Embodiments)

First, additional information pertaining to the crops will be given. In the above embodiments, "crops" refer to all things that can be harvested with an agricultural method. The "crops" are not particularly limited to a certain type, and include, for example, vegetables, fruits, and flowering plants as commonly classified according to the portion of the plant used (often referred to as horticulture classification or artificial classification).

Vegetables include, for example, vegetable fruits, leafy and stem vegetables, root vegetables, and mushrooms.

Here, vegetable fruits include eggplant, pepinos, tomatoes, mini tomatoes, tamarillos, red peppers, Capsicum annuum, shishito peppers, habanero peppers, green peppers, bell peppers, colored peppers, pumpkins, zucchini, cucumbers, horned melons, Cucumis melo, goya, wax gourd, chayote, sponge gourd, calabash, okra, strawberries, watermelons, muskmelons, Korean melons, and additionally include grains such as corn, and beans such as adzuki beans, string beans, peas, edamame beans, cowpeas, winged beans, fava beans, soybeans, sword beans, peanuts, lentil beans, and sesame seeds.

Leafy and stem vegetables include leafy vegetables such as common iceplant, ashitaba, mustard greens, cabbage, watercress, kale, Japanese mustard spinach, butterhead lettuce, red leaf lettuce, choy sum, sangchu lettuce, santou Chinese cabbage, shiso, Chrysanthemum greens, watershield, shirona cabbage, Japanese parsley, celery, tatsoi, daikon leaves, *Brassica juncea*, chisha lettuce, bok choy, *Brassica campestris*, rapeseed greens, nozawana, napa cabbage, parsley, haruna vegetables, chard, spinach, common henbit, mizuna, Stellaria, Stellaria media, Stellaria aquatica, mibuna greens, Cryptotaenia japonica, Brussels sprouts, mulukhyah, leaf lettuce, arugula, lettuce, and wasabi leaves; stem vegetables such as leeks, thin leaks, baby scallions, garlic chives, asparagus, Aralia cordata, kohlrabi, zha cai, bamboo shoots, garlic, water spinach, leeks, scallions, and onions; flowering vegetables such as artichokes, broccoli, cauliflower, edible chrysanthemum, nabana, fuki, and myoga; and sprout vegetables such as sprouts, bean sprouts, and kaiware daikon sprouts.

Root vegetables include turnips, daikon, hatsuka daikon, wasabi, horseradish, burdock root, Chinese artichoke, ginger, carrots, Chinese onions, lotus root, tiger lily root, and additionally include potatoes such as sweet potatoes, taro, common potatoes, Chinese yam (yamato yam), and Dioscorea japonica (Japanese mountain yam, wild yam).

Mushrooms include enokitake, Pleurotus eryngii, Auricularia auricula-judae, Phallus indusiatus, shiitake, shimeji, Tremella fuciformis, Pleurotus citrinopileatus, Lactifluus volemus, Pholiota nameko, honey fungus, Lyophyllum decastes, oyster mushroom, white beech mushroom, bunapi-shimeji, porcini, Lyophyllum shimeji, Tricholoma equestre, Grifola frondosa, common mushrooms, matsutake, Hericium erinaceus, Rhizopogon roseolus, and truffles.

Fruits include a variety of citrus fruits such as mandarin oranges; apples, peaches, Asian pears, European pears, bananas, grapes, cherries, silverberries, Rubus berries, blueberries, raspberries, blackberries, mulberries, loquats, figs, persimmons, akebi, mangos, avocados, jujubes, pomegranates, passion fruit, pineapples, bananas, papayas, Armenian plums, Chinese plums, plums, peaches, kiwis, Chinese quince, yamamomo, Castanea crenata, miracle fruit, guava, starfruit, and acerola.

Flowering plants include Hollyhock, bouvardia, Clarkia amoena, evening primrose, stock, flowering cabbage, Lunaria annua, Gladiolus murielae, Iris, gladiolus, California poppy, Peperomia, Calceolaria, Antirrhinum majus, Torenia, Primula sieboidii, Cyclamen persicum, Lampranthus spectabilis, Anthurium, calla lilies, Caladium, Acorus calamus, Syngonium, Spathiphyllum, Dieffenbachia, Philodendron, cactuses, Ajuga, Physostegia virginiana, Salvia, Begonia, Curcuma, Nymphaea, Portulaca, Viola mandshurica, Ammi majus, Setcreasea, Rhoeo spathacea, Tradescantia, Impatiens balsamina, Solanaceae, Petunia, Physalis alkekengi, carnations, Dianthus, Dianthus chinensis, Gypsophila elegans, Gypsophila paniculata, Silene armeria, Guzumania, Strelitzia, Phlox subulata, Phlox, Phlox paniculata, Spiraea japonica, Amacrinum howardii, Amaryllis, Chrysanthemum, Marguerite, Clivia, Cyrtanthus, Daffodil, Leucojum aestivum, Zephyranthes candida, Nerine, Crinum, Eucharis, lycoris, Agave, Celosia argentea, Gomphrena globosa, Ipomoea nil, Evolvulus, Tarenaya hassleriana, Pelargonium, Kalanchoe, Scabiosa, Lathyrus odoratus, Lupinus, Lurigio, Myosotis, Astilbe Arendsii group, Saxifraga stolonifera, Agapanthus africanus, Polygonatum odoratum, Aloe, Ornithogalum, Rohdea japonica, Chlorophytum comosum, Hosta, Fritillaria camschatcensis, Gloriosa, Colchicum, Sansevieria trifasciata, Sandersonia aurantiaca, Ophiopogon japonicas, tulips, Tulbaghia, Convallaria majalis, Dracaena, Triteleia, Polygonatum falcatum, Phormium, Fritillaria, Hyacinthus, Tricyrtis hirta, Hemerocallis fulva, Liriope muscari, Lilium, Alstroemeria, Ruscus, Cypripedium macranthos, Calanthe discolor, Oncidium, Cattleya, Colmanara, Bletilla striata, Cymbidium, Coelogyne, Dendrobium, Doitaenopsis, Phalaenopsis japonica, Paphiopedilum, Vanda, Cochlioda, Phalaenopsis Braunau, Miltonia, Exacum, Eustoma russellianum, Gentian scabra, Lantana camara, Rosa, Cerasus, and Gerbera, and further include plants appreciated for their leaves, such as Cleyera japonica, Cycas revolute, Polypodiopsida, Dracaena, Aspidistra elatior, Monstera, Epipremnum aureum, Dracaena deremensis, Polyscias, Jungle Bush, Stemona japonica, Carex, and Pittosporum tenuifolium.

Although a number of crops have been given as examples above, the method of preserving freshness according to the above embodiments is also applicable to crops other than those given as examples.

Next, additional information pertaining to freshness preservation will be given. In the above embodiments, "freshness preservation" means preserving the freshness of a crop for as long as possible. The freshness preservation required for a crop depends on the type and value of the crop.

For example, for vegetables whose the leaves or stem are mainly used (leafy vegetables), such as lettuce or spinach, preventing withering (reducing a reduction in water retention), preventing color change (for example, etiolating and browning), preventing softening, and preventing molding are important. Moreover, for vegetables whose fruit is mainly used (vegetable fruits), such as strawberries or tomatoes, or for tree fruits such as apples, preventing color change (for example, etiolating and browning), preventing softening, and preventing molding are important. Furthermore, for flowering plants, preventing withering (reducing a reduction in water retention), preventing color change (for example, etiolating and browning), and preventing molding are important.

Next, additional information pertaining to usage of the methods of preserving freshness described in the above embodiments will be given. In the above embodiments, the method of freshness preservation is used in a scenario in which the crop is stored in a storage room of a store or a scenario in which the crop is displayed on the sales floor of a store, but the method of freshness preservation may be used in other scenarios.

The harvested crop is transported to the city in a refrigerated vehicle by, for example, a farmer, an agricultural cooperative, or a specialty establishment that pre-cools the crop. Then, after the harvested crop is purchased by a wholesaler in a market, the crop is stored in a storage room of a supermarket, and then displayed on the sales floor.

In this scenario, the method of preserving freshness can be used in the specialty establishment, refrigerated vehicle, supermarket storage room and sales floor.

Moreover, after the harvested crop passes through the farmer or a first delivery company, the harvested crop is transported in a delivery vehicle to a second delivery company. Then, after the harvested crop is transported for the second time in a delivery vehicle, the harvested crop is transported to a buyer's house (a private home).

In this scenario, the method of preserving freshness can be used in the first delivery company, delivery vehicles, and second delivery company.

Moreover, for example, the method of freshness preservation described in the above embodiments may be used on crops that have not yet been harvested in addition to harvested crops.

Moreover, the blue light transmits through typical materials used in containers for the crop (for example, polyethylene). As such, the method of freshness preservation described in the above embodiments can also be used on crops packed in boxes and on crops packed in bags.

Moreover, since blue light also permeates through crops, the method of freshness preservation described in the above embodiments can also be used on crops stacked behind other crops.

Moreover, the method of freshness preservation described in the above embodiments may be used in a pitch black (dark) environment, and may be used in an environment illuminated by artificial light, such as light emitted by white LEDs. Moreover, the method of freshness preservation described in the above embodiments may be used under sunlight.

Moreover, after the crop is irradiated with blue light, the crop may be stored in a pitch black (dark) environment, may be stored in an environment illuminated by artificial light, such as light emitted by white LEDs, and may be stored under sunlight.

Other Embodiments

The method of freshness preservation, the freshness preservation device, the repository, and the display device according to the above embodiments have hereinbefore been described, but the present disclosure is not limited to the above embodiments.

For example, in the above embodiments, LEDs are used in the first illuminant, the second illuminant, and the third illuminant, but the first illuminant, the second illuminant, and the third illuminant are not limited to the use of LEDs. For example, fluorescent tubes, metal halide lamps, sodium lamps, halogen lamps, xenon lamps, neon tubes, inorganic electroluminescent lamps, organic electroluminescent lamps, chemical luminescent lamps, and lasers may be used in the first illuminant, the second illuminant, and the third illuminant. Note when a light source that emits light other than blue light, such as a fluorescent tube, is used in the first illuminant, a spectral filter that only transmits light of a wavelength corresponding to blue light may be used. A plurality of types of light sources may be used in each of the first illuminant, the second illuminant, and the third illuminant, and the first illuminant, the second illuminant, and the third illuminant may use mutually different light sources.

Moreover, the form of the radiation of the blue light by the first illuminant is not particularly limited. The first illuminant may instantaneously radiate a substantially large amount of light, like a strobe light, for example. Moreover, the first illuminant may radiate a low amount of blue light over a long period of time. The same applies to the second illuminant.

Moreover, the first illuminant may continuously radiate blue light and, alternatively, may intermittently radiate blue light. Here, "continuously radiate" means continuously radiate blue light for a predetermined period of time (for example, 5 minutes). Here, "intermittently radiate" means radiating blue light for 10 seconds and then not radiating blue light for 10 seconds, and repeating this 30 times each to achieve a total radiation time of 5 minutes.

Moreover, in the above embodiments, all or some of the elements (for example, the controller) may be configured as specialized hardware or realized by executing a suitable software program. Each structural element may be realized as a result of a program execution unit of a CPU or processor or the like loading and executing a software program stored in a storage medium such as a hard disk or a semiconductor memory chip.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A method of preserving freshness of a harvested crop, the method comprising:
    irradiating the harvested crop with blue light by using a first illuminant;
    misting the harvested crop with water mist by using a mister while irradiating the harvested crop with the blue light; and
    irradiating the harvested crop with infrared light by using a second illuminant after irradiating the harvested crop with the blue light by using the first illuminant and misting the harvested crop with the water mist by using the mister, wherein:

the irradiating the harvested crop with the blue light and the misting are performed on the harvested crop in a state in which the harvested crop is not being cooled by using a cooling device.

2. The method according to claim 1, further comprising irradiating the harvested crop with white light by using a third illuminant while irradiating the harvested crop with the blue light by using the first illuminant.

3. The method according to claim 1, wherein a photon flux density of the blue light is in a range from 0.1 $\mu mol \cdot m^{-2} \cdot s^{-1}$ to 10 $\mu mol \cdot m^{-2} \cdot s^{-1}$, inclusive.

4. The method according to claim 1, wherein the blue light is radiated for a radiation time of 30 minutes or less.

5. The method according to claim 1, wherein the blue light has an emission spectrum in a range from 350 nm to 550 nm, inclusive.

6. The method according to claim 1, wherein droplets of the water mist have a diameter of 10 µm or less.

7. The method according to claim 1, wherein the harvested crop is one of a vegetable, a fruit, and a flowering plant.

8. The method according to claim 1, wherein the first illuminant includes a light emitting diode.

9. A freshness preservation device for preserving freshness of a harvested crop, the freshness preservation device comprising:
a first illuminant that irradiates the harvested crop with blue light;
a mister that mists the harvested crop with water mist while the first illuminant irradiates the harvested crop with the blue light; and
a second illuminant that irradiates the harvested crop with infrared light after the first illuminant irradiates the harvested crop with the blue light and the mister mists the harvested crop with the water mist, wherein:
the freshness preservation device comprises no cooling device for cooling the harvested crop.

10. The freshness preservation device according to claim 9, further comprising a controller that controls at least one of an intensity and a radiation time of the blue light.

11. The freshness preservation device according to claim 9, further comprising a third illuminant that irradiates the harvested crop with white light while the first illuminant irradiates the harvested crop with the blue light.

12. A repository, comprising:
the freshness preservation device according to claim 9; and
a housing that houses the freshness preservation device.

13. A display device, comprising:
the freshness preservation device according to claim 9; and
a shelf for displaying the harvested crop.

14. The freshness preservation device according to claim 9, wherein the first illuminant includes a light emitting diode.

* * * * *